United States Patent Office 3,519,664
Patented July 7, 1970

3,519,664
REACTION PRODUCTS OF MIXTURES OF CHLORIDES OF CERTAIN METALS WITH BORATE ESTERS
Robert C. Wade, Ipswich, Mass., assignor to Ventron Corporation, Beverly, Mass., a corporation of Massachusetts
No Drawing. Continuation-in-part of application Ser. No. 670,418, Sept. 25, 1967. This application Nov. 18, 1968, Ser. No. 776,804
Int. Cl. C07f 5/06, 7/28, 15/02
U.S. Cl. 260—429.5                                         12 Claims

ABSTRACT OF THE DISCLOSURE

Products made by reacting a mixture of at least two chlorides of metals selected from Ti(IV), Zr(IV), Hf(IV), Sn(IV), Si(IV), Al(III), Fe(III), Ga(III), In(III), Mo(V), Nb(V), Ta(V) and W(VI) with at least one borate ester such as trimethyl borate, triethyl borate, tripropyl borate, tributyl borate, trihexyl borate, trihexylene glycol biborate, and tri(m,p,cresyl borate, trimethoxy boroxine in a molar ratio of at least 0.33 mole of the selected borate for each sum of the molar proportions of the chlorides of the selected metal totaling one mole in a diluent, such as the selected borate, methylene chloride, chloroform, and carbon tetrachloride, at a temperature between room temperature and about 200° C. until the reaction mixture ceases to give off organic chloride thereby forming a liquor comprising the diluent and a compound of complex chemical structure comprising the selected metals, boron, carbon, hydrogen, chlorine, and oxygen. The complex compound is isolated by removing volatile material from the reaction mixture by evaporation.

This application is a continuation-in-part of my copending application Ser. No. 670,418, filed Sept. 25, 1967, now abandoned, which was a division of my copending application Ser. No. 670,419, filed Sept. 25, 1967, now Pat. No. 3,455,976, dated July 15, 1969.

This invention relates to products of unknown complex chemical structure prepared by reacting a mixture of chlorides of metals selected from Ti(IV), Zr(IV), Hf(IV), Sn(IV), Si(IV), Al(III), Fe(III), Ga(III), In(III), Mo(V), Nb(V), Ta(V), and W(VI) with certain borate esters.

My above mentioned copending application Ser. No. 670,419, filed Sept. 25, 1967, discloses the preparation of highly useful products of complex chemical structure which are the reaction products of trimethyl borate with the chloride of a metal selected from the group consisting of Ti(IV), Zr(IV), Hf(IV), Al(III), Fe(III), Mo(V), Nb(V), Sn(IV), Si(IV), Ta(V), W(VI) and mixtures of such chlorides. While it is preferred to employ trimethyl borate, it may be replaced by other borate esters such as trimethyl borate, tripropyl borate, tributyl borate, trihexyl borate, trihexylene glycol biborate, tri(m,p,cresyl borate, and mixtures thereof or a mixture of one or more of such borate esters with trimethyl borate. I have now found that trimethoxy boroxine may also replace trimethyl borate and that Ga(III) and In(III) are operative metal chlorides.

As disclosed in my copending application Ser. No. 670,419, in forming these products of unknown complex chemical structure using trimethyl borate, the substantially anhydrous chloride of the selected metal is mixed with substantially anhydrous trimethyl borate in a molar ratio of at least about 0.33 mole of borate ester for each mole of the chloride of the selected metal, preferably, in a substantially anhydrous inert diluent, such as methylene chloride, chloroform, carbon tetrachloride, or an excess of trimethyl borate. The reactions may be carried out between room temperature and about 120° C. The order of addition of the reagents is not critical. Thus, the metal chloride may be added to the boron ester, or the boron ester may be added to the metal chloride, or both may be added simultaneously to the reaction zone.

In the case of the very reactive combination of reagents, such as titanium tetrachloride or ferric trichloride with trimethyl borate, the reactions start immediately at room temperature and the temperature of the reaction mixture rises slightly with methyl chloride being given off. In the case of less reactive combinations of reagents, it is often necessary to heat the reagents mildly, for example, to the boiling point of methylene chloride (40.1° C.) or trimethyl borate (67°–68° C.), or in a few cases to temperatures as high as 90°–120° C. In the case of silicon tetrachloride the reaction is very slow but the rate of reaction may be accelerated by the addition of a minor amount of more reactive metal chloride as a promoter, such as ferric chloride or titanium tetrachloride, etc.

When methyl chloride ceases to be given off the reaction is complete and the desired reaction product may be isolated by evaporation of volatile material, such as the diluent or excess reagent. This may be accomplished by applying a vacuum to the reaction vessel while gently heating. In some cases the reaction product is highly soluble in the reaction medium, therefore, stronger heating under vacuum is required to remove the volatile material. In general, temperatures not over 100° C. under a final vacuum of 1–20 mm. of mercury are sufficient to remove volatile material.

The method for reacting the chlorides of the previously mentioned group of metals with other borate esters, such as triethyl borate, tripropyl borate, tributyl borate, trihexyl borate, trihexylene glycol biborate, tri(m,p,cresyl borate, and mixtures thereof or a mixture of one or more of such borates with trimethyl borate is similar to that described for the reaction with trimethyl borate. With these borate esters, however, the reactions are, in general, considerably slower and temperatures up to about 200° C. may be used to obtain reasonable reaction rates. Since the boiling points of the organic chloride by-products are considerably higher than methyl chloride, they must be distilled or evaporated from the reaction product by heating the reaction mixture either at atmospheric or reduced pressure.

In addition to the inert diluents previously mentioned these complex reactions may also be carried out in aliphatic hydrocarbons, such as petroleum ether, hexane, heptane, octane, and cyclohexane. However, the reactions proceed much more slowly in these diluents and, therefore, are not preferred.

The compositions of the complex reaction products of the borate esters and metal chlorides appear to vary with the molar ratios of the borate esters to metal chlorides as indicated by the amount of organic chloride given off. As the molar ratio of borate ester to metal chloride increases, the solubility and the acidity decreases.

These reaction products appear to be polymeric in nature and very complex in chemical structure. While I do not wish to be limited to any theory there is evidence that one or more metal-oxygen boron bonds are formed in the reactions leading to materials which in their simplest form may have the following general formula

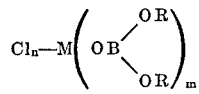

and polymers formed by coordination cross linking thereof, where M represents the metal, n plus m equals the valence of the metal and R is selected from alkyl, aryl or the connecting structure of the boroxine group.

These complex products are soluble to a greater or lesser extent in water giving acidic solutions. When freshly prepared in methylene chloride they are at least slightly soluble in methylene chloride and also in one or more solvents chloroform, carbon tetrachloride, acetone, and glycol ethers, such as monoethyl ethylene glycol and dimethyl ethylene glycol ethers. Upon standing or drying, a product is formed which is insoluble in non-polar organic solvents. When dissolved in water or alcohol and applied to surfaces such as glass and cellulosic fabrics, and the solvent evaporated, marked water repellency develops. The water repellency can be enhanced by washing in a 1 percent solution of soap, rinsing and drying.

When reacting a mixture of chlorides of selected metals with a borate ester, at least 0.33 mole of the selected borate is used for each sum of the molar proportions of the chlorides of the selected metals totaling one mole.

These complex products prepared with trimethyl borate and the chlorides of two or more metals still contain unreacted chlorine atoms which are reactive toward many organic compounds which contain a reactive hydrogen atom, such as amino, hydroxyl, or carboxyl groups. They may also react with further amounts of trimethyl borate if reactive chlorine atoms remain on the metal. These products are slightly soluble in methylene chloride and most are soluble to some extent in highly polar solvents, such as alcohol.

The invention is illustrated further by the following specific examples:

EXAMPLE 1

The equipment used in this experiment comprised a stirred reaction flask which was fitted with an addition funnel, thermometer and reflux condenser. The reflux condenser in turn was connected to an empty safety trap, then to a water scrubber and then to a gas meter. 156 grams (1.5 moles) of trimethyl borate was reacted with a mixture of 47.5 grams (0.25 mole) $TiCl_4$ and 33.5 grams (0.25 mole) $AlCl_3$ dissolved and suspended in 200 grams of methylene chloride. An exthermic reaction occurred with the immediate giving off of methyl chloride. The reaction mixture was heated and methylene chloride distilled off. The final reaction temperature was 60° C. A total of about 0.8 mole of $CH_3Cl$ was given off. 109 grams of light gray solids were recovered. The solids were practically insoluble in water.

Elemental analysis of the product showed: Ti=11.8%; Al=3.52%; Cl=21.0%; B=7.7%; C=17.2%; H=3.4%; and O (by difference) =35.4%.

EXAMPLE 2

In equipment similar to that used in Example 1, 200 grams of carbon tetrachloride together with 104 grams (1 mole) of trimethyl borate were placed in the reaction flask. Then 42 grams of $SiCl_4$ (0.25 mole) and 47.5 grams (0.25 mole) of $TiCl_4$ were mixed and placed in the addition funnel. The mixed chlorides were added over a period of 4 minutes to the reaction flask at room temperature. The temperature in the flask rose about 20° C. and yellow stringy solids formed. The temperature of the reaction mass was slowly increased and methyl chloride was given off. The solids in the flask became very gummy and wrapped up into a ball. Later as the reaction proceeded, the solids redissolved but never completely dissolved. The reaction mass was heated to 65°–75° C. for about 14 hours. A total of about 1.5 moles of methyl chloride was given off. When $CH_3Cl$ ceased to be given off, an additional 300 grams of $CCl_4$ was added to the flask. The yellow solids did not completely dissolve. However, the liquid phase did contain a dissolved product which left a white gelatinous film wherever the solvent evaporated on the wall of the flask. 87 grams of light tan solid product was recovered by vacuum evaporation of the liquors. The solids were infusible, but decomposed when strongly heated. hey were slightly soluble in water.

Elemental analysis showed: (percent): Ti, 15.2; Si, 7.0; B, 9.8; Al, 7.8; C, 10.8; N, 3.0; and O (by difference) 53.6.

When glass fabric was dipped into a 1% aqueous solution of the product and dried, marked delustering of the fabric occurred. Good water repellency also developed which was improved by dipping the fabric in a 1% soap solution, rinsing and drying.

EXAMPLE 3

The reaction product of $TiCl_4$ and $AlCl_3$ with trimethyl borate as described in Example 1 was used in this experiment. 1 gram of this product was added to 150 ml. of dry hexane in a 250 ml. bottle stoppered with a rubber septum cap. It appeared to be completely insoluble. Stirring was accomplished by a magnetic stirring bar. Then 5 ml. of 25% $Al(C_2H_5)_3$ in hexane was injected into the suspension by means of a hypodermic needle. Excess was vented through a similar needle. The complex product was an active catalyst for polymerizing ethylene.

EXAMPLE 4

Reaction products were produced by reacting trimethyl borate separately with mixtures of the chlorides of the following metals: Ti(IV) with Zr(IV); Ti(IV) with Hf(IV); Ti(IV) with Sn; Ti(IV) with Fe(III); Ti(IV) with Cu(I); Ti(IV) with Mo(V); Ti(IV) with Nb(IV; and Ti(IV) with W(VI). Each of the complex reaction products produced was reduced with an aluminum alkyl to produce a series of complex products each of which was an extremely active catalyst for polymerizing ethylene.

In my copending application Ser. No. 670,419, filed Sept. 25, 1967 I have claimed methods for producing compounds of unknown chemical structure by reacting borate esters selected from the group consisting of trimethyl borate, triethyl borate, tripropyl borate, tributyl borate, trihexyl borate, trihexylene glycol biborate, and tri(m,p,cresyl borate with a chloride of a metal selected from the group consisting of Ti(IV), Zr(IV), Hf(IV), Sn(IV), and Si(IV) together with the complex compounds formed thereby.

In my copending application Ser. No. 670,450, filed Sept. 25, 1967, now Pat. No. 3,457,289, I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p,cresyl borate with a chloride of a metal selected from the group consisting of Al(III), Fe(III), and Cu(I) together with the complex compounds formed thereby.

In my copending application Ser. No. 670,449, now abandoned, filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate and tri(m,p,cresyl borate with a chloride of a metal selected from the group consisting of Mo(V), Nb(V), Ta(V), and W(VI) together with the complex compounds formed thereby.

In my copending application Ser. No. 670,417, now abandoned, filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p,cresyl borate with a chloride of a first metal selected from the group consisting of Ti(IV), Zr(IV), Hf(IV), Sn(IV), Si(IV), Al(III), Fe(III), Cu(I), Mo(V), Nb(V), Ta(V), and W(VI) in an inert diluent to form a liquor comprising the diluent and a first compound of complex chemical structure and then adding to the liquor the chloride of a second metal selected from said group and permitting it to react with said compound of complex chemical structure to form a second compound of complex chemical structure comprising both of the selected metals, boron, carbon, hydrogen, chlorine, and oxygen.

I claim:

1. The method which comprises mixing at least one substantially anhydrous borate ester selected from the group consisting of trimethyl borate, triethyl borate, tripropyl borate, tributyl borate, trihexyl borate, trihexylene glycol bibiorate, tri(m,p, cresyl borate and trimethoxy boroxine with a mixture of at least two substantially anhydrous chlorides of metals selected from the group consisting of Ti(IV), Zr(IV), Hf(IV), Sn(IV), Si(IV), Al(III), Fe(III), Ga(III), In(III), Mo(V), Nb(V), Ta(V) and W(VI) in a molar ratio of at least about 0.33 mole of the selected borate for each sum of the molar proportions of the chlorides of the selected metals totaling one mole in an inert substantially anhydrous diluent, permitting the chlorides of the selected metals to react with the selected borate at a temperature between room temperature and about 200° C. until the reaction mixture ceases to give off organic chloride thereby forming a liquor comprising said diluent and a compound of complex chemical structure comprising the selected metals, boron, carbon, hydrogen, chlorine, and oxygen.

2. The method as claimed by claim 1 wherein the diluent is selected from the group consisting of the selected borate ester, methylene chloride, chloroform, and carbon tetrachloride.

3. A compound of complex chemical structure produced by the method claimed by claim 1 after removal of volatile material therefrom.

4. The method which comprises mixing substantially anhydrous trimethyl borate with a mixture of at least two substantially anhydrous chlorides of metals selected from the group consisting of Ti(IV), Zr(IV), Hf(IV), Sn(IV), Si(IV), Al(III), Fe(III), Ga(III), In(III), Mo(V), Nb(V), Ta(V), and W(VI) in a molar ratio of at least 0.33 mole of the selected borate for each sum of the moles of the chlorides of the selected metals totaling one mole in an inert substantially anhydrous diluent, permitting the chlorides of the selected metals to react with the selected borate at a temperature between room temperature and about 120° C. until the reaction mixture ceases to give off methyl chloride thereby forming a liquor comprising said diluent and a compound of complex chemical structure comprising the selected metals, boron, carbon, hydrogen, chlorine, and oxygen.

5. The method as claimed by claim 4 wherein the diluent is selected from the group consisting of the selected borate, methylene chloride, chloroform, and carbon tetrachloride.

6. A compound of complex chemical structure produced by the method as claimed by claim 4 after removal of volatile material therefrom.

7. The method as claimed by claim 4 wherein the chlorides of the selected metals are titanium tetrachloride and aluminum trichloride.

8. The method as claimed by claim 4 wherein the chlorides of the selected metals are titanium tetrachloride and silicon tetrachloride.

9. The method as claimed by claim 4 wherein the chlorides of the selected metals are ferric trichloride and silicon tetrachloride.

10. A compound of complex chemical structure produced by the method as claimed by claim 7 after removal of volatile material therefrom.

11. A compound of complex chemical structure produced by the method as claimed by claim 8 after removal of volatile material therefrom.

12. A compound of complex chemical structure produced by the method as claimed by claim 9 after removal of volatile material therefrom.

References Cited

UNITED STATES PATENTS 2,312,208 2/1943 Clayton et al. ____ 260—429 XR
2,346,155 4/1944 Denison et al. ____ 260—429 XR

OTHER REFERENCES

Steinberg et al.: Organoboron Chemistry, John Wiley & Sons, New York, vol. 1, pp. 144–146, 460, 597 and 598.

HELEN M. McCARTHY, Primary Examiner

H. M. S. SNEED, Assistant Examiner

U.S. Cl. X.R.

117—126; 252—8.6, 431; 260—429, 429.3, 429.7, 439, 448, 448.2